United States Patent [19]
Sakaki et al.

[11] 3,762,463
[45] Oct. 2, 1973

[54] ROTARY REGENERATOR FOR GAS TURBINE ENGINES

[75] Inventors: Yoshihiro Sakaki; Katsuo Suzuki, both of Yokohama, Japan

[73] Assignee: Nissan Motor Company, Limited, Yokohama, Japan

[22] Filed: Aug. 2, 1971

[21] Appl. No.: 168,122

[30] Foreign Application Priority Data
Oct. 27, 1970 Japan............................ 45/106230
Oct. 28, 1970 Japan............................ 45/94295

[52] U.S. Cl......................... 165/8, 64/11, 64/27 L, 74/443, 74/446
[51] Int. Cl............................................. F28d 19/00
[58] Field of Search............................. 165/8, 9, 10; 74/443, 446; 64/11, 27 R, 27 S, 27 L, 27 B

[56] References Cited
UNITED STATES PATENTS
3,401,741  9/1968  Paluszny et al. ......................... 165/8
3,430,687  3/1969  Wardale ................................. 165/8
3,496,993  2/1970  Azelborn ................................ 165/8
3,559,725  2/1971  Fucinari et al. ...................... 165/9 X
3,586,096  6/1971  McLean ................................. 165/8

*Primary Examiner*—Albert W. Davis, Jr.
*Attorney*—Robert E. Burns et al.

[57] ABSTRACT

A rotary regenerator for gas turbine engines, which includes a heat-accumulator in a disc form which is rotatable with a rotary shaft, an externally toothed ring gear which is positioned concentrically and at a slight spacing from the heat-accumulator and which is driven to rotate the heat-accumulator and a driving means mating with the ring gear to drive it. Aligned recesses are formed circumferentially equidistantly in outer and inner rims of the heat-accumulator and the ring gear, respectively, and leaf springs are mounted in the aligned recesses to press the heat-accumulator and the ring gear against each other to support the former resiliently by the latter. Mechanical shocks and impact created by a driving force transferred from the ring gear to the heat-accumulator are absorbed by the leaf springs so that the heat-accumulator made of a material susceptible to shocks and impact is protected therefrom.

9 Claims, 4 Drawing Figures

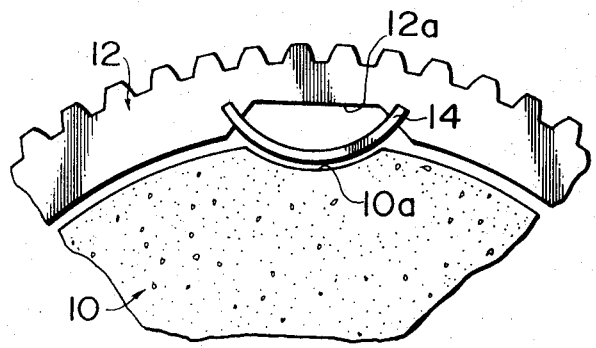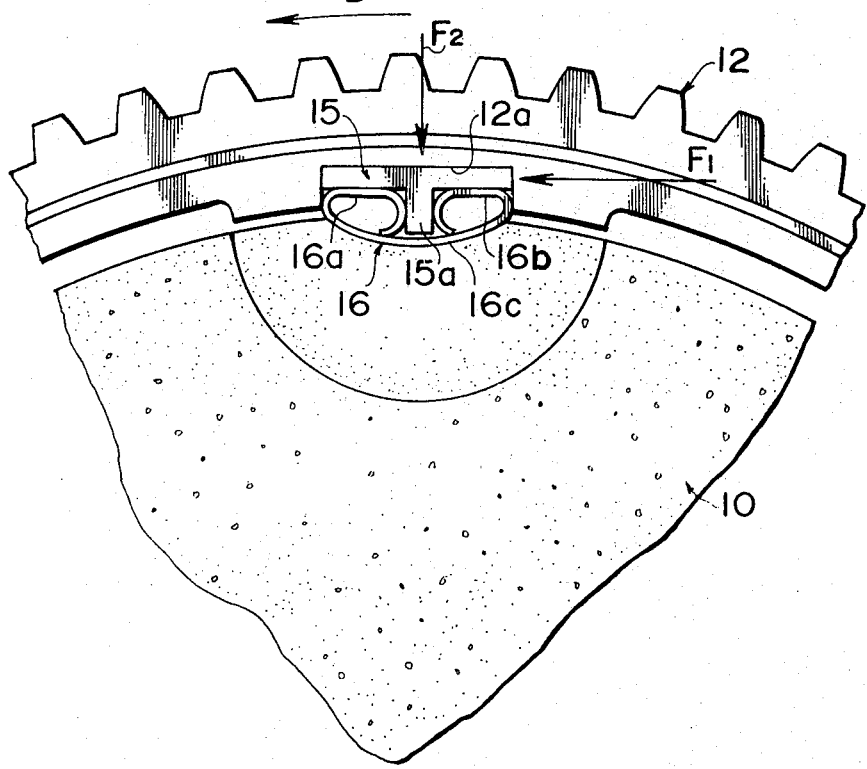

ROTARY REGENERATOR FOR GAS TURBINE ENGINES

This invention relates to gas turbine engines and, more particularly, to a rotary regenerator or matrix for use in the gas turbine engines.

Regenerators or heat exchangers are used in specific types of gas turbine engines for transferring heat from the turbine exhaust to the air leaving the compressors to increase the performance efficiency of the turbine engines. Such regenerators include heat-accumulators through which the heat is transferred. The heat-accumulators are required to withstand rapid large temperature changes and to have low pressure drop. The heat-accumulators are thus usually made of porous materials such as ceramics.

Rotary regenerators are presently under development which would provide higher performance efficiency. The rotary regenerators use rotatable heat-accumulators in a disc form which are driven for rotation relatively to the flows of the air from the compressors and the exhaust from the turbines. Some heat accumulators are driven by ring gears which are externally toothed and which are positioned concentrically around the heat-accumulators. Since, in this instance, the heat-accumulators are made of ceramics or other porous materials which are susceptible to mechanical shocks and impact, it is important that they be protected from destruction or damage resulting from the shocks and impact caused by a driving force transferred from the ring gears to the heat-accumulators during operation.

It is, therefore, an object of this invention to provide a rotary regenerator having an improved rotatable heat-accumulator which is prevented from being subject to mechanical shocks and impact when driven.

Another object of this invention is to provide a rotary regenerator having an improved rotatable heat-accumulator which is efficiently freed of mechanical shocks and impact caused by a driving force to be transferred thereto and which has a simple and economical construction adapted for production on a commercial basis.

The rotary regenerator or matrix to achieve these objects includes a rotatable heat-accumulator in a disc form having formed in its outer rim a plurality of circumferentially unidirectionally spaced generally arcuate recesses extending substantially in parallel to an axis of rotation of the heat-accumulator, an externally toothed ring gear positioned concentrically and at a substantial spacing from the outer rim of the heat-accumulator and driven for rotation with the heat-accumulator wherein the ring gear has formed in its inner rim a plurality of recesses which are respectively aligned with the arcuate recesses in the heat-accumulator, and a plurality of spring means seated in mutually aligned recesses in the heat-accumulator and the ring gear for pressing the heat-accumulator and the ring gear against each other. The heat-accumulator is thus supported resiliently by the ring gear so that, when the former is driven by the latter, the mechanical shocks and impact created by the driving force carried to the heat-accumulator is absorbed by the spring means interposed between the outer peripheral wall of the heat-accumulator and the inner peripheral wall of the ring gear.

Each of the spring means may comprise a leaf spring which is embedded at both ends in the inner peripheral wall of the ring gear and which is held in abutting engagement with the heat-accumulator through its intermediate portion. Alternatively, each of the recesses formed in the inner rim of the ring gear may be formed by a pair of grooves which extend in parallel to the axis of rotation of the heat-accumulator and which is spaced by a land projecting the aligned arcuate recess in the heat-accumulator. In this instance, each of the spring means interconnecting the heat-accumulator to the ring gear comprises a leaf spring which has a pair of rounded end portions fitting in the grooves and which has a central portion fitting in the aligned arcuate recess in the heat-accumulator and passed clear over the land intermediate the grooves. If desired, these grooves and the land may be formed in a pad which is mounted in a substantially rectangular recess formed in the inner rim of the ring gear and which has a generally T-shaped cross section providing the groove on both sides and the land at its center. The pad may be a unitary member engaging in the rectangular recess with the ring gear or integral with the ring gear.

Drawings illustrate two preferred embodiments of this invention in which:

FIG. 2 is a fragmentary side end view of the embodiment shown in FIG. 1;

FIG. 4 is a fragmentary plan view showing, on an enlarged scale, details of the embodiment shown in FIG. 3.

Figure 1:
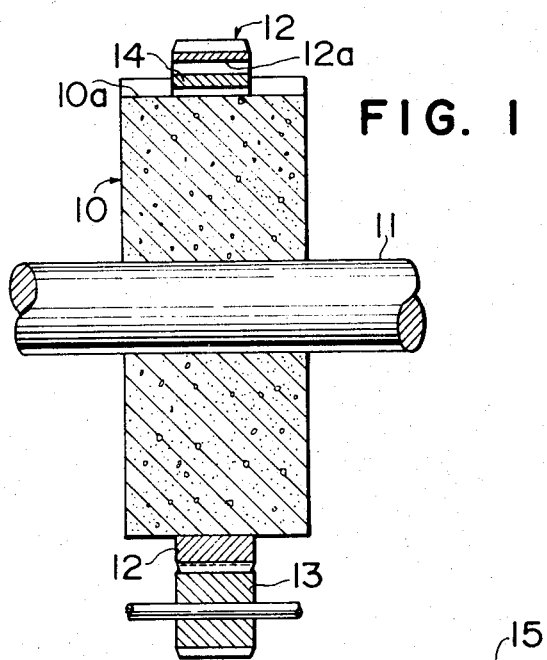
FIG. 1 is a diametrically cross sectional view schematically showing a first preferred embodiment of this invention.

Reference is now made to FIGS. 1 and 2. The rotary regenerator for the gas turbine engines includes a rotatable heat-accumulator 10 in a disc form which is mounted on a rotary shaft 11. The heat-accumulator 10 is made of a porous material such as ceramics to withstand rapid large temperature changes, as previously discussed. An externally toothed ring gear or annular member 12 is positioned concentrically around and at a substantial spacing from an outer rim of the heat-accumulator 10 so that the ring gear in situ is movable with respect to the heat-accumulator. The ring gear 12 meshes with and is driven by a suitable toothed driving means 13 which may be a pinion gear or a chain sprocket, as the case may be.

The heat-accumulator 10 has formed in its outer rim a plurality of circumferentially equidistantly spaced generally arcuate recesses 10a, one of which is seen in FIG. 2. The ring gear 12, on the other hand, has formed in its inner rim a plurality of recesses 12a which are respectively aligned with the arcuate recesses 10a in the heat-accumulator 10. A plurality of leaf springs 14 are seated in the recesses 10a and 12a which are aligned with each other. Each of the leaf springs 14 has its end portions embedded in the inner peripheral wall of the ring gear 12 at locations adjoining the recesses 12a and its intermediate portion held in abutting engagement with the heat-accumulator 10, as seen in FIG. 2. The leaf spring 14 is thus fixed at both ends to the inner rim of the ring gear 12 and is warped in its intermediate portion against the wall of the heat-accumulator 10 defining the recess 10a.

When the ring gear 12 is rotationally driven by the driving means 13, the driving force is transferred from the ring gear 12 to the heat-accumulator 10 through the leaf springs 14 pressing the heat-accumulator and the ring gear against each other. Since, in this instance, the heat-accumulator 10 is supported resiliently on the ring gear 12 by means of the leaf springs 14 which are circumferentially disposed, the shocks and impact which are liable to be invited by the driving force from the ring gear 12 are absorbed by the leaf springs 14 and are prevented from being carried to the heat-accumulator.

The heat-accumulator is usually subjected to elevated temperatures during use so that the outer peripheral wall thereof is heated up to the order of about 400° C to 500° C. The heat is transferred to the leaf springs and the tension in the springs will be reduced consequently. Since, however, the leaf springs are fixed at both ends to the ring gear, such reduction in the spring tension causes practically no serious problems even in the event the springs are heated to elevated temperatures. This not only provides wide selection of the materials for the springs but permits the use of relatively thin leaf springs, assuring easy and economical production of the regenerator as a whole.

Figure 3:
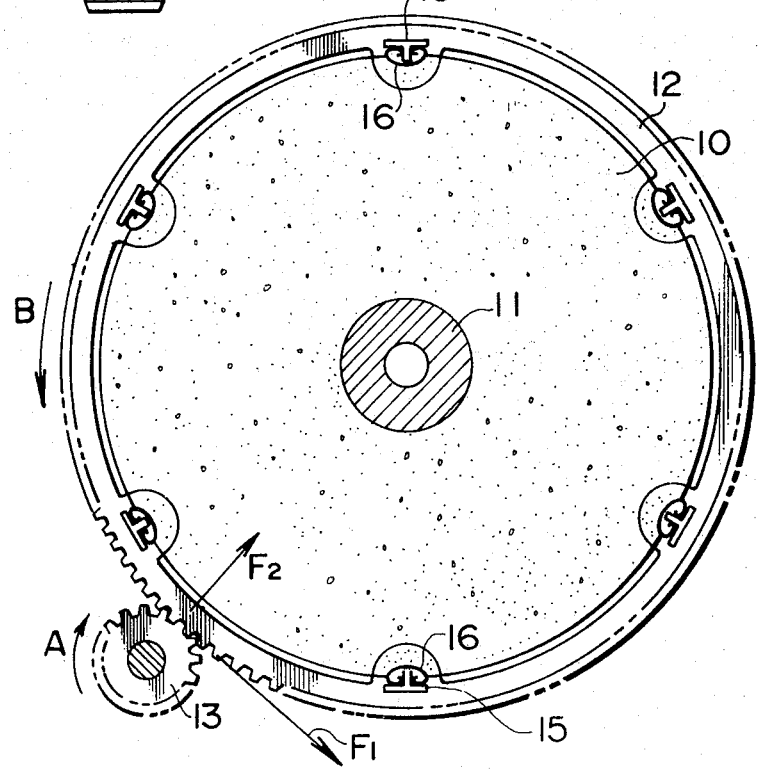
FIG. 3 is an overall plan view shematically showing a second preferred embodiment of this invention.

FIGS. 3 and 4 illustrate a second preferred embodiment of this invention having a modified impact absorbing arrangement which is adapted to offer higher absorption efficiency.

The heat-accumulator 10 also has formed in its outer rim a plurality of circumferentially equidistantly spaced generally arcuate recesses 10a which are shown to be six in number in FIG. 3. The externally toothed ring gear or annular member 12, on the other hand, has formed in its inner rim a plurality of rectangular recesses 12b which are respectively aligned in opposing relationship with the arcuate recesses 10a in the heat-accumulator 10.

A pad 15 is snugly received in each of the rectangular recesses 12b. The pad 15 is generally T-shaped in cross section to provide a pair of grooves which are spaced by a land or abutment member 15a projecting into the arcuate recess 10a and terminating at a substantial spacing from the heat-accumulator 10, as shown. Between the heat-accumulator 10 and the pad 15 thus constructed are seated a plurality of leaf springs 16 each of which has a pair of rounded end portions 16a and 16b fitting in the grooves defined by the pad 15 and an intermediate portion 16c held in abutting engagement in the arcuate recess 10a with the heat-accumulator 10. The heat-accumulator 10 and the ring gear 12 are thus pressed against each other through the leaf springs 16 so that the former is supported resiliently by the latter.

When, now, the driving means 13 such as the pinion gear or chain sprocket is driven to rotate in the direction of arrow A as seen in FIG. 3, then the ring gear 12 turns in the direction of arrow B so as to exert a driving force which consists of tangential and radial components. This driving force is carried to the heat-accumulator uniformly through all the pads 15 and leaf springs 16 so that each of the pads and springs equally receives a tangential component $F_1$ and a radial component $F_2$. As indicated in FIG. 4, the tangential component $F_1$ first acts upon one end of the pad 15 and is carried to the rounded end portion 16a of the leaf spring 16 through the land 15a with the result that a rotational force is imparted to the heat-accumulator 10 through the spring 16. Since, thus, the heat-accumulator 10 is driven through a resilient agent, it is isolated from the shocks and impact which are liable to result from the driving force. The radial component $F_2$, on the other hand, first acts upon the outer wall of the pad 15 and is transferred to the rounded end portions 16a and 16b of the leaf spring 16 whereby the shocks and impact are absorbed by the spring. In the event the rounded end portions 16a and 16b of the spring 16 are deformed by the radial component $F_2$, the land 15a is brought into indirect engagement with the heat-accumulator 10 through the intermediate portion 16c of the spring so that the spring is prevented from being deformed any further. The spring 16 is in this manner protected from being damaged.

Although the pads 15 have been described as unitary members which are respectively mounted in the rectangular recesses 12b in the ring gear 12, they may be integral with the ring gear provided a pair of grooves are formed by each of them and spaced by a land projecting into the aligned arcuate recess 10a in the heat-accumulator 10.

It will now be appreciated from the foregoing description that the rotary regenerator according to this invention has an improved rotatable heat-accumulator which is efficiently free of mechanical shocks and impact caused by a driving force to be transferred thereto and which is simple in construction and easy to manufacture. The rotary regenerator having these outstanding features will be advantageously used in various gas turbine engines.

We claim:

1. In a rotary regenerator having a rotatable disc-type heat-accumulator: driving means for rotationally driving said rotary regenerator about an axis of rotation comprising means defining a plurality of first arcuate recesses disposed equidistantly along the circumference of said disc-type heat-accumulator and extending parallel to said axis of rotation, an externally toothed ring gear positioned concentrically around said heat-accumulator in spaced-apart relationship therewith and having along its inner surface means defining a plurality of second recesses corresponding to said first recesses in number and position, each of said second recesses having therein means defining a pair of grooves extending parallel to said axis of rotation and separated by a land projecting toward said heat-accumulator, and a plurality of spring means disposed between respective pairs of said first and second recesses and each comprising a pair of rounded end portions fitted respectively in said grooves of its associated second recess and a central portion fitted in its associated first recess and extending over the associated land for resiliently supporting said heat-accumulator by said ring gear.

2. A rotary regenerator according to claim 1, in which each of said spring means comprises a leaf spring.

3. A rotary regenerator according to claim 2, in which said grooves and said land within each second recess are formed by a T-shaped pad fitted within said second recess which has a rectangular configuration.

4. A rotary regenerator according to claim 3, in which said pad comprises a unitary member.

5. A rotary regenerator according to claim 4, in which each said pad is integral with said ring gear.

6. In a rotary heat-accumulator regenerator for use with a gas turbine engine: a rotary heat-accumulator disc; an annular member disposed concentrically around said disc and having an inner surface spaced-apart from the disc circumference; drive means for rotationally driving said annular member; and means for transmitting the rotary movement of said annular member to said disc to effect rotation of said disc comprising means spaced circumferentially around the circumference of said disc defining a first plurality of arcuate recesses, means spaced circumferentially around said inner surface defining a second plurality of recesses in said annular member each spaced from one of said arcuate recesses and defining therewith a set of opposing recesses, an abutment member having opposite side portions disposed in each of said second plurality of recesses and projecting towards said disc, and a plurality of springs respectively disposed in each set of opposing recesses coacting together to resiliently support said disc within said annular member, each spring having a curved middle portion extending into its associated arcuate recess and abutting against said disc and a pair of arcuate end portions each abutting against opposite side portions of its associated abutment member; whereby rotation of said annular member is transmitted through said springs to effect rotation of said disc.

7. A rotary heat-accumulator regenerator according to claim 6; wherein each said spring comprises a leaf spring disposed in each set of opposing recesses and compressed between said annular member and said disc.

8. A rotary heat-accumulator regenerator according to claim 6; including a pad mounted within each of said second recesses and having one of said abutment members connected thereto.

9. A rotary heat-accumulator regenerator according to claim 8; wherein each pad and abutment member comprise a unitary structure.

* * * * *